(12) United States Patent
Mateos Guzman et al.

(10) Patent No.: US 11,406,185 B1
(45) Date of Patent: Aug. 9, 2022

(54) ARTICULATED RACK FOR ACTUATION OF A ROBOTIC DRAWER

(71) Applicants: UBTECH NORTH AMERICA RESEARCH AND DEVELOPMENT CENTER CORP, Pasadena, CA (US); UBTECH ROBOTICS CORP LTD, Guangdong (CN)

(72) Inventors: Luis Alfredo Mateos Guzman, San Gabriel, CA (US); Chengkun Zhang, Temple City, CA (US)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 17/358,038

(22) Filed: Jun. 25, 2021

(51) Int. Cl.
*A47B 88/457* (2017.01)
*F16H 19/04* (2006.01)

(52) U.S. Cl.
CPC ........... *A47B 88/457* (2017.01); *F16H 19/04* (2013.01)

(58) Field of Classification Search
CPC ...... A47B 88/453; A47B 88/457; F16H 19/04
See application file for complete search history.

(56) References Cited

U.S. PATENT DOCUMENTS

2021/0330111 A1* 10/2021 Nowinski ........... G07F 11/1653
2022/0082322 A1* 3/2022 Wang .................... A47B 88/497

FOREIGN PATENT DOCUMENTS

CN 111772378 A * 10/2020 ............ A47B 88/41

OTHER PUBLICATIONS

Luis Alfredo Mateos Guzman, "Bionic Sea Urchin Robot with Foldable Telescopic Actuator," 2020 IEEE/ASME International Conference on Advanced Intelligent Mechatronics (AIM), Boston, MA, USA, (Jul. 6-9, 2020), pp. 1063-1068 (6 pgs.). Paper authored by inventor.

* cited by examiner

*Primary Examiner* — Daniel J Rohrhoff
(74) *Attorney, Agent, or Firm* — Bayes PLLC

(57) ABSTRACT

According to one aspect, an actuator of a robotic drawer is disclosed. The actuator may include a plurality of articulation components that form an articulated rack. The actuator may include a plurality of pins each coupled to an exterior of one of the plurality of articulation components. The actuator may include a transformer box coupled to a pinion and configured to move along an exterior of the articulated rack as the pinion moves along the surface. The transformer box may include a first guide configured to apply a first force to an arm of each of the pins as the transformer box moves in a first direction. The first force may cause the pin to rotate in a first rotational direction until the arm is fitted into a cam of the articulated rack such that adjacent articulation components are held in a fixed position, causing the articulated rack to extend.

20 Claims, 9 Drawing Sheets

104

ARTICULATED RACK FOR ACTUATION OF A ROBOTIC DRAWER

TECHNICAL FIELD

Embodiments of the present disclosure relate to an articulated rack for actuation of a robotic drawer.

BACKGROUND

Handsfree drawer systems (also referred to as "robotic drawer systems") have utility in a wide variety of use cases and environments. These use cases may include any instance where a user performing a task finds benefit in accessing items contained in a drawer without putting down what she is doing to open and/or close the drawer herself. A hospital setting is one such environment where a handsfree drawer system may have great utility. For example, while attending a patient, a physician may require medication, surgical equipment, and/or other types of medical supplies, which are organized in the drawer of a cabinet. However, it may be inconvenient or even dangerous for the physician to turn away from the patient to open a drawer to access these items. Moreover, the more surfaces the physician touches, the higher the likelihood of germ contamination in what must remain a sterile environment. In such scenarios, a robotic drawer system would be particularly useful because the items can be accessed by the physician with ease, which may minimize risk to the patient and/or risk of contamination. Unfortunately, conventional robotic drawer systems still suffer from challenges.

Some of these challenges relate to a lack of precision with which the drawers are opened or closed and a large size of cavity required to house an actuator within the drawer system. To minimize the cavity size within the drawer system, known robotic drawer systems may use small actuators so that the system is not overly bulky. The downside of using available actuators of reduced size is that they are unable to apply a high actuation force. Consequently, there is a lack of precision with respect to opening and closing the drawers of these systems. The lack of precision may cause the drawers to be off-centered, which may lead to the drawers getting stuck. On the other hand, other known robotic drawer systems may employ actuators that are able to apply a large actuation force, but at the cost of size. For example, available actuators that can generate a large actuation force are bulky, and hence, robotic drawer systems that employ these actuators must include a cavity space large enough to accommodate their bulky size.

Thus, there is an unmet need for an actuator that can generate a high enough actuation force to open and close drawers with a high degree of precision, while at the same time has a reduced size compared to known actuators.

SUMMARY

According to one aspect of the disclosure, an actuator of a robotic drawer is disclosed. The actuator may include a plurality of articulation components coupled to form an articulated rack. The actuator may also include a plurality of pins each coupled to an exterior of one of the plurality of articulation components. Each pin may include a cylindrical body. Each pin may also include a first arm located at a first end of the cylindrical body. The actuator may further include a pinion configured to move along a surface of the articulated rack. The actuator may further include a transformer box coupled to the pinion and configured to move along an exterior of the articulated rack as the pinion moves along the surface. The transformer box may include a first guide configured to apply a first force to the first arm of each of the plurality of pins as the transformer box moves in a first direction. The first force may cause the pin to rotate in a first rotational direction until the first arm is fitted into a cam of the articulated rack such that adjacent articulation components are held in a fixed position, which may cause the articulated rack to extend.

According to another aspect of the present disclosure, a robotic cabinet is disclosed. The robotic cabinet may include a frame. The robotic cabinet may further include at least one drawer positioned within the frame. The robotic cabinet may further include an actuator coupled to the at least one drawer. The actuator may include a plurality of articulation components coupled to form an articulated rack. The actuator may also include a plurality of pins each coupled to an exterior of one of the plurality of articulation components. Each pin may include a cylindrical body. Each pin may also include a first arm located at a first end of the cylindrical body. The actuator may further include a pinion configured to move along a surface of the articulated rack. The actuator may further include a transformer box coupled to the pinion and configured to move along an exterior of the articulated rack as the pinion moves along the surface. The transformer box may include a first guide configured to apply a first force to the first arm of each of the plurality of pins as the transformer box moves in a first direction. The first force may cause the pin to rotate in a first rotational direction until the first arm is fitted into a cam of the articulated rack such that adjacent articulation components are held in a fixed position, which may cause the articulated rack to extend.

According to another aspect of the present disclosure, a method of actuating a robotic drawer is disclosed. The method may include operating a pinion along a surface of an articulated rack such that a transformer box coupled to the pinion moves along an exterior of the articulated rack. The articulated rack may include a plurality of articulation components. The articulated rack may also include a plurality of pins each coupled to an exterior of one of the plurality of articulation components. Each pin may include a cylindrical body. Each pin may also include a first arm located at a first end of the cylindrical body. Each pin may also include a second arm located at a second end of the cylindrical body. The method may also include applying, using a first guide of the transformer box, a first force to the first arm of each of the plurality of pins as the transformer box moves with the pinion in a first direction. The method may also include applying, using a second guide of the transformer box, a second force to the second arm of each of the plurality of pins as the transformer box moves with the pinion in a second direction. The first force may cause the pin to rotate in a first rotational direction until the first arm is fitted into a cam of the articulated rack and adjacent articulation components are held in a fixed position to open the robotic drawer. The second force cause the pin to rotate in a second rotational direction until the first arm is no longer fitted in the cam of the articulated rack such that adjacent articulation components are no longer held in the fixed position and the robotic drawer closes.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

DETAILED DESCRIPTION

Figure 1:
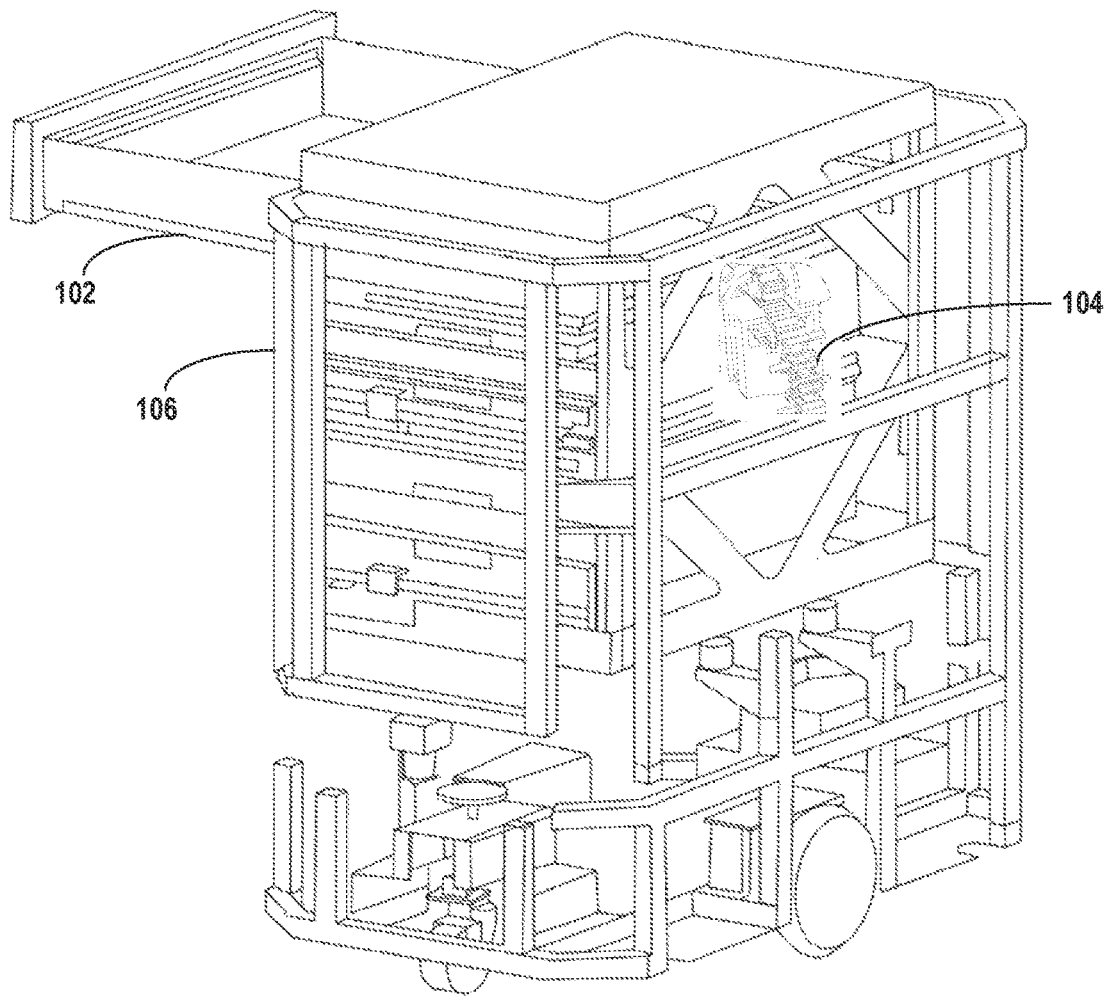
FIG. 1 illustrates a diagram of an exemplary robotic drawer system, according to certain embodiments of the present disclosure.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that one or more embodiments described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the terms "based on," "based upon," and terms with similar meaning may be understood as not necessarily intended to convey an exclusive set of factors and may, instead, allow for existence of additional factors not necessarily expressly described, again, depending at least in part on context.

Various aspects of the present disclosure will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

As mentioned above in the BACKGROUND section, conventional actuators cannot provide a high enough actuation force to open and close drawers of robotic drawer systems while achieving a high degree of precision at the same time without being undesirably bulky. To overcome these and other challenges, the present robotic drawer system employs an actuator that includes an articulated rack that can be made rigid or flexible by the operation of a pinion along its length. When the drawer of the present robotic drawer system is closed, the articulated rack is bent such that it fits within a small cavity behind or beneath the drawer. To open the drawer, the pinion is moved in a first direction along the top of the articulated rack. As it moves, a series of pins are sequentially rotated in a first direction, which causes adjacent articulation components of the rack to be held in a fixed, rigid position. As each articulation component is sequentially made rigid, the articulated rack extends and generates a high actuation force. The high actuation force opens the drawer rapidly and with a high degree of precision, as compared to known actuators of similar size. Then, the pinion may be operated in the opposite direction to close the drawer. In so doing, the pins are rotated in a second direction such that adjacent articulation components are sequentially made flexible again and bend to fit within the small cavity, thereby pulling the drawer closed. Additional details of the present robotic drawer system and its exemplary actuator are provided below in connection with FIGS. 1-7.

Some exemplary embodiments are described below with reference to an actuator used in robotic drawer systems, but the application of the actuator described below is not limited to robotic drawer systems. Rather, one of ordinary skill would understand that the following description, embodiments, and techniques may apply to any type of actuator system (e.g., linear actuator, telescopic actuators, an internal robot extending/compressing element such as limbs, fingers, neck, and/or spine, just to name a few) known in the art without departing from the scope of the present disclosure.

FIG. 1 illustrates a diagram of an exemplary robotic drawer system 100 (hereinafter "robotic drawer system 100"), according to certain embodiments of the present disclosure. Robotic drawer system 100 may include any type of cabinet or apparatus that includes at least one frame and at least one drawer that can automatically open and close. For example, robotic drawer system 100 may include, e.g., a free standing cabinet, a desk, a work bench, an armoire, a side table, a kitchen table, kitchen cabinetry, a medicine cabinet, a safety deposit box, or a glove compartment, just to name a few. Moreover, robotic drawer system 100 may have wheels or casters so that the system can be moved manually, autonomously, or under remote control. However, in some embodiments, robotic drawer system 100 may lack wheels and be fully stationary.

According to the present disclosure, robotic drawer system 100 may include at least one drawer 102 and frame 106. To open/close drawer(s) 102, robotic drawer system 100 may use an exemplary linear actuator 104 (hereinafter "linear actuator 104"). Linear actuator 104 may have a proximal end that is coupled to a back surface, side surface, under surface, or another surface of drawer 102. Linear actuator 104 may include a plurality of actuation components coupled together linearly with hinges along its bottom. The bottom hinges enable linear actuator 104 to bend, and hence, fit inside a cavity behind or under drawer 102 when unactuated. Then, as a pinion (shown in FIG. 2) is operated along the top, adjacent actuation components are held in a fixed position along their top surface such that linear actuator 104 is made rigid and to extend. The extension generates an actuation force that opens drawer 102 with a high degree of precision, as compared to known actuators of similar size. Additional details of linear actuator 104 and its various components will now be described in connection with FIGS. 2-7.

Figure 2:
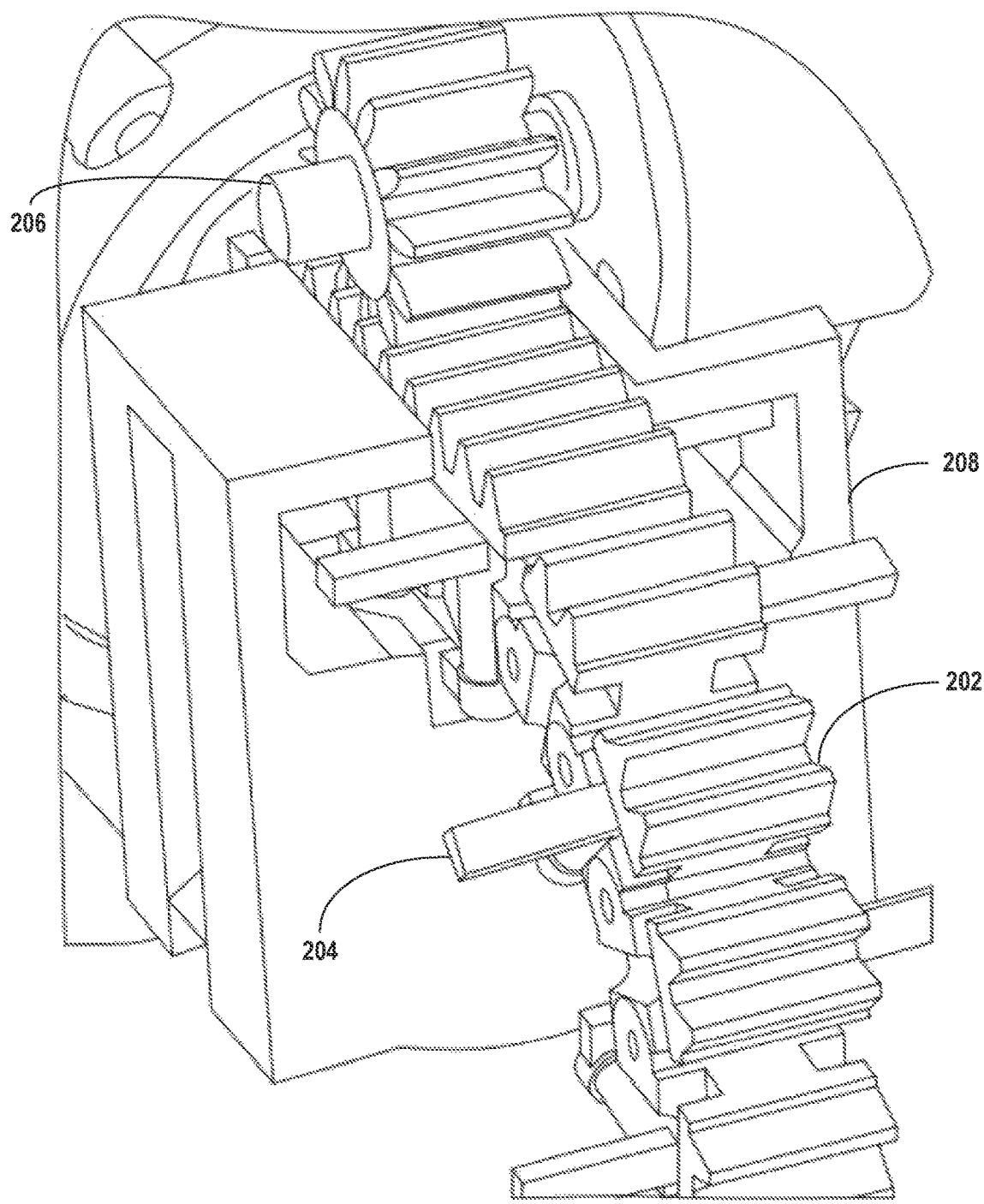
FIG. 2 illustrates a detailed view of an exemplary actuator of the robotic drawer system of FIG. 1, according to certain embodiments of the present disclosure.
Figure 3:
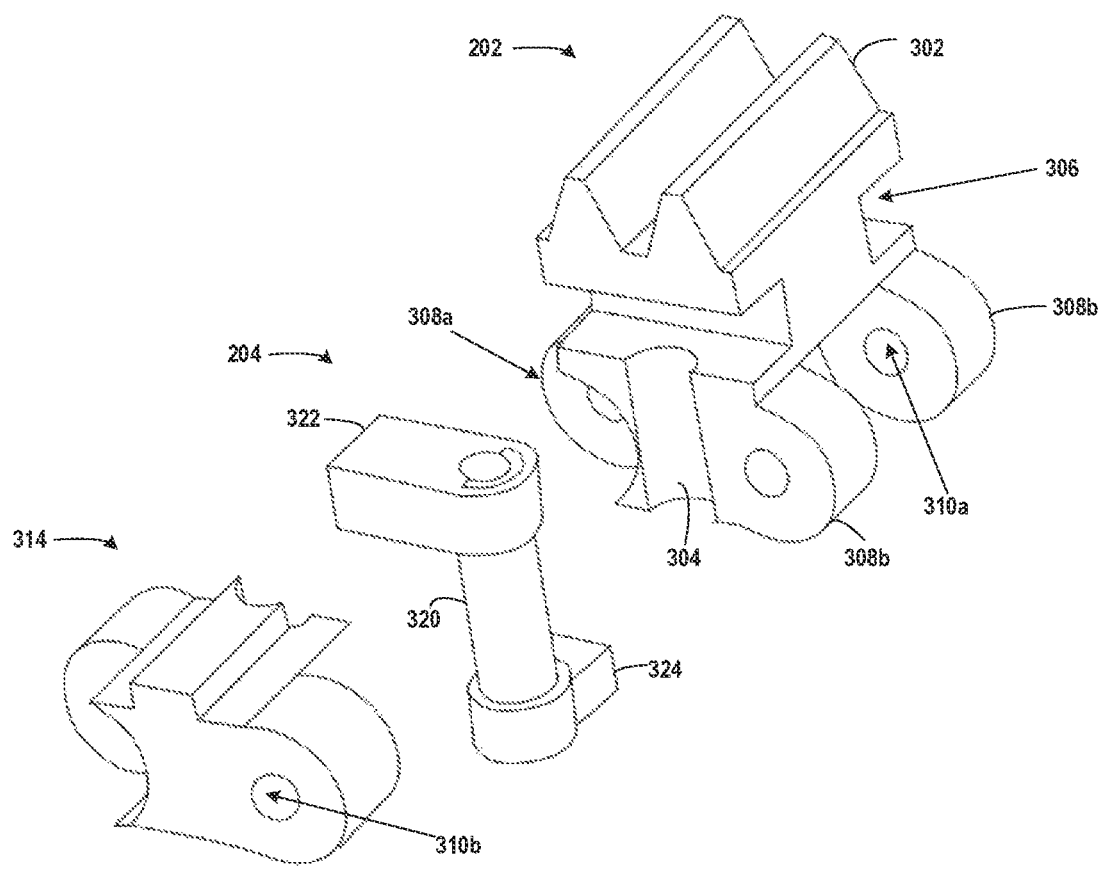
FIG. 3 illustrates an exploded view of exemplary components of the actuator of FIG. 2, according to certain embodiments of the present disclosure.
Figure 4A:
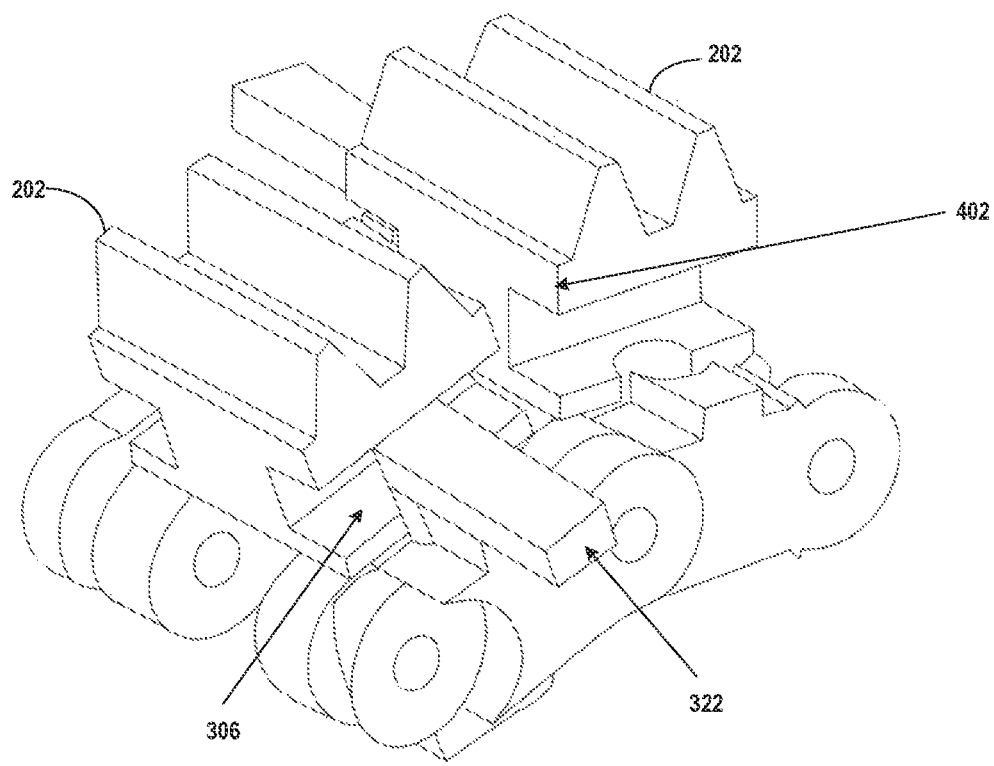
FIG. 4A illustrates a first detailed view of exemplary components of the actuator of FIG. 2, according to certain embodiments of the present disclosure.
Figure 4B:
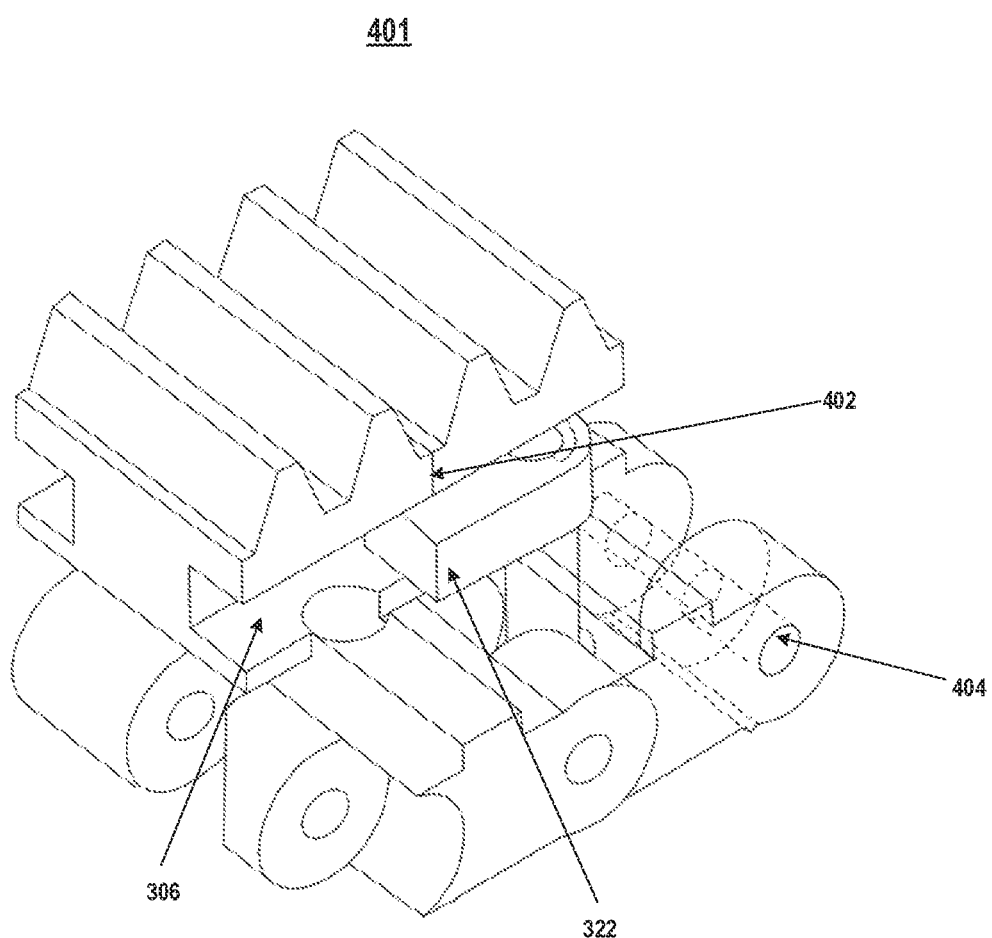
FIG. 4B illustrates a second detailed view of exemplary components of the actuator of FIG. 2, according to certain embodiments of the present disclosure.
Figure 5:
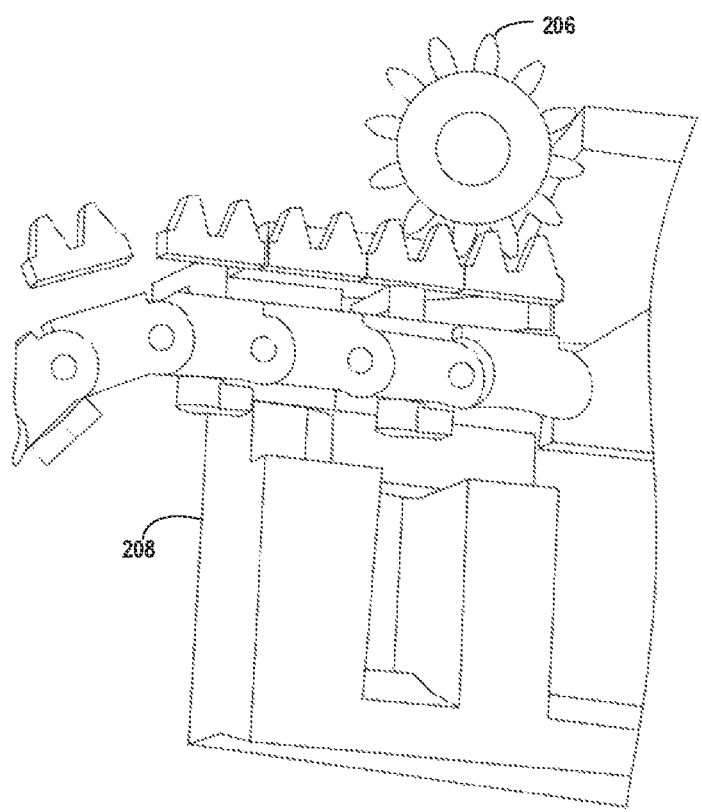
FIG. 5 illustrates a first internal view of various exemplary components of the actuator of FIG. 2, according to certain embodiments of the present disclosure.
Figure 6A:
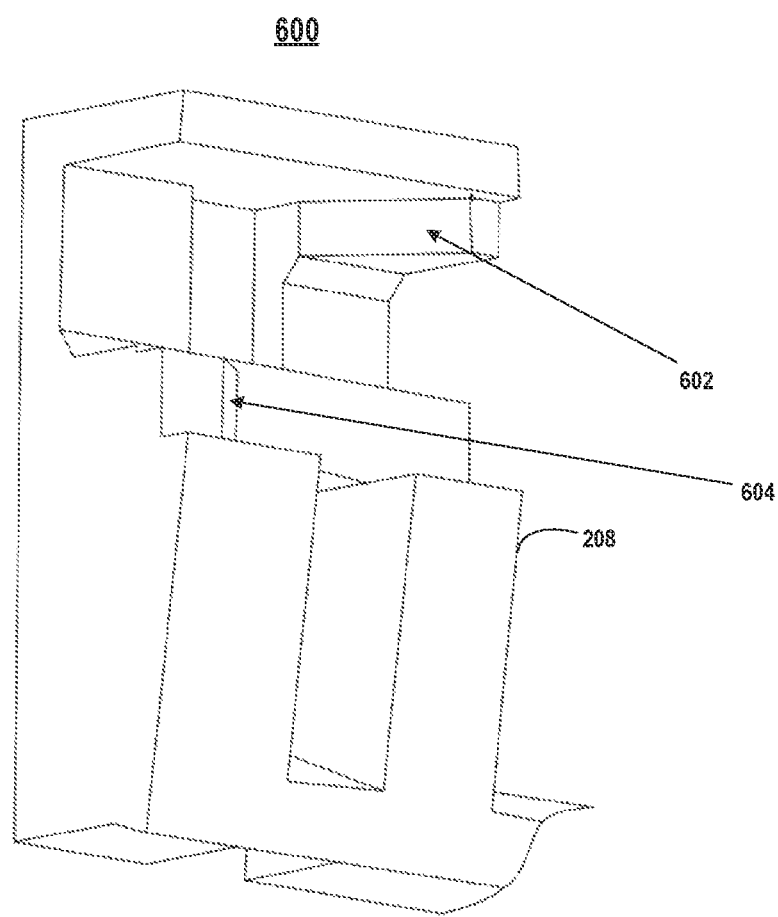
FIG. 6A illustrates a first internal view of an exemplary transformer box of the actuator of FIG. 2, according to certain embodiments of the present disclosure.
Figure 6B:
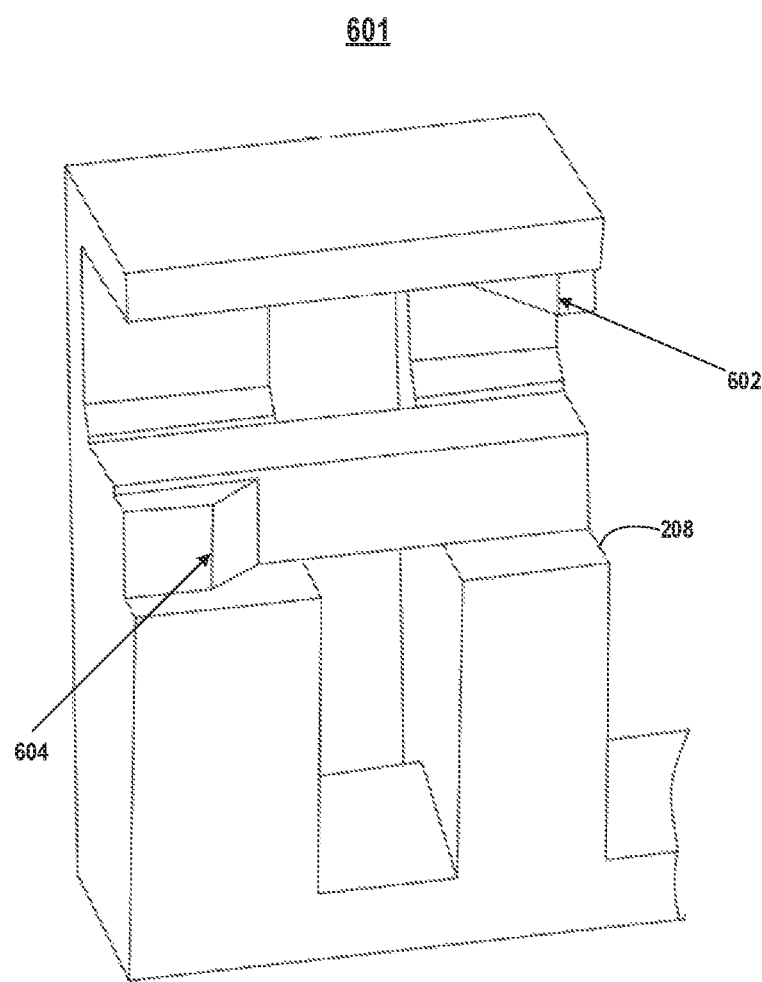
FIG. 6B illustrates a second internal view of an exemplary transformer box of the actuator of FIG. 2, according to certain embodiments of the present disclosure.

FIG. 2 illustrates a detailed view of the linear actuator 104 of the robotic drawer system 100 of FIG. 1, according to certain embodiments of the present disclosure. FIG. 3 illustrates an exploded view 300 of exemplary components of linear actuator 104 of FIG. 2, according to certain embodiments of the present disclosure. FIG. 4A illustrates a first detailed view 400 of exemplary components of the linear actuator 104 of FIG. 2, according to certain embodiments of the present disclosure. FIG. 4B illustrates a second detailed view 401 of exemplary components of the linear actuator 104 of FIG. 2, according to certain embodiments of the present disclosure. FIG. 5 illustrates an internal view 500 of various exemplary components of linear actuator 104 of FIG. 2, according to certain embodiments of the present disclosure. FIG. 6A illustrates a first internal view 600 of an exemplary transformer box of the actuator of FIG. 2, according to certain embodiments of the present disclosure. FIG. 6B illustrates a second internal view 601 of an exemplary transformer box of linear actuator 104 of FIG. 2, according to certain embodiments of the present disclosure. FIGS. 2, 3, 4A, 4B, 5, 6A, and 6B will be described together. As used herein, the term "articulated rack" may refer to an assembly of components which include, but not limited to, articulation components 202, pins 204, pin covers 314, and rods 404.

Referring to FIG. 2, linear actuator 104 may include various components. For example, linear actuator 104 may include a plurality of articulation components 202, a plurality of pins 204, a pinon 206, and a transformer box 208 coupled to pinion 206 and configured to move along the length of linear actuator 104. A motor (not shown) coupled to pinion 206 may be configured to drive pinion 206 to move along a top surface of linear actuator 104. The motor may be battery operated, solar powered, or coupled to an external power source.

As pinion 206 moves across the top of articulation components 202, inner guides (shown in FIGS. 6A and 6B) of transformer box 208 may apply a force that causes pins 204 to rotate in a first rotational direction. As pins rotate in the first rotational direction, pins 204 may be pushed into a cam 306 and extend beyond an interface between adjacent articulation components 202. Thus, when pins 204 are fitted into cam 306, adjacent articulation components 202 are prevented from rotating with respect to their lower hinge. Thus, as pinion 206 moves in the first direction, linear actuator 104 is made rigid, and thus, extends. On the other hand, as pinion 206 reverses direction along the top of articulation components 202, a second inner guide of transformer box 208 causes pins 204 to rotate in a second rotational direction, which frees pins 204 from cam 306 such that adjacent articulation components 202 are free to rotate about their lower hinge. This causes the articulated rack to bend. As shown in FIG. 2, pins 204 may be positioned on both sides of the articulated rack, and hence, transformer box 208 may include two halves such that the articulated rack is received through transformer box 208. Inner guides on each half of transformer box 208 may rotate pins 204 on either side of the articulated rack such that linear actuator 104 is made rigid or flexible depending on the direction of pinion 206.

As seen in FIG. 3, articulation components 202 may include (along its top portion) one or more teeth 302, which may be configured to receive gear teeth of pinion 206. A cam 306 (horizontal groove) may be formed in a portion of articulation components 202 under teeth 302. In some embodiments, a number of teeth associated with each articulation component 202 may increase the farther the articulation component 202 is from the proximal end of the articulated rack attached to the drawer, or vice versa.

Each articulation component 202 may include at least a male base portion 308a and at least a female base portion 308b. Male base portion 308a of one articulation component 202 may be configured to fit between female base portions 308b of an adjacent actuation component, and vice versa. Male and female base portions 308a, 308b each include an aperture 310a through which a rod 404 (shown in FIG. 4B) may be fitted such that the base portions of adjacent articulation components 202 form a hinge. The plurality of hinges enable linear actuator 104 to bend when pins 204 are not fitted into cam 306.

Still referring to FIG. 3, each articulation component 202 may include a vertical groove 304 on both sides. Vertical groove 304 may be sized and shaped to receive pin 204. Pin 204 may include a cylindrical body 320, a first arm 322 located at a first end of cylindrical body 320, and a second arm 324 located at a second end of cylindrical body 320. Each of the first arm 322 and the second arm 324 is oriented perpendicular to a longitudinal axis of cylindrical body 320, as well as to each other in a horizontal plane. Pin cover 314 may be configured to fit over pin 104 and couple it to articulation component 202. Pin cover 314 may include apertures 310b that are configured to align with aperture 310a such that when a rod 404 is inserted through apertures 310a, 310b, adjacent articulation components 202 are coupled together. Moreover, pin cover 314 maintains pin 104 in vertical groove 304 such that it can still rotate when a force is applied to first arm 322 or second arm 324.

Referring to FIG. 4A, two adjacent articulation components 202 are shown in an unfixed position. In other word, adjacent articulation components 202 of FIG. 4A may rotate about their hinged base portion. When in the unfixed position, first arm 322 is positioned such that it is not held in cam 306 and does not extend across the interface 402 of adjacent articulation components 202. On the other hand, adjacent articulation components 202 are shown in a fixed position in FIG. 4B. In other words, the adjacent articulation components 202 in FIG. 4B are unable to rotate about their hinged base portion. The length of first arm 322 is designed such that if pin 204 is positioned at the midpoint of an articulation component 202, the length of first arm 322 is greater than half the width of articulation component 202 such that it extends beyond interface 402. Moreover, cam 306 has a floor portion and a ceiling portion that each extend outward to hold first arm 322 in place when fitted therein. An exploded view of the articulated rack traveling through transformer box 208 is shown in FIG. 5.

Referring to FIG. 6A, each half of transformer box 208 includes a first guide 602 configured to apply a first force to first arm 322 of each of the plurality of pins 204 as transformer box 208 moves in a first direction along with pinion 206. The first force may cause pin 204 to rotate in a first rotational direction (which is counterclockwise in the present example) until first arm 322 is fitted into cam 306 of the articulated rack. Once fitted into cam 306, first arm 322 extends past the interface 402 and adjacent articulation components 202 are made rigid and articulated rack extends. As the articulated rack extends, drawer 102 is opened.

Referring to FIG. 6B, each half of transformer box 208 may also include a second guide 604 configured to apply a second force to second arm 324 as transformer box 208 moves in a second direction along with pinion 206. The second force may cause pin 204 to rotate in a second rotational direction (which is clockwise in the present example) until first arm 206 is no longer fitted in cam 306, which enables the articulated rack to bend. As the articulated rack bends, drawer 102 is closed.

As shown in FIGS. 6A and 6B, first guide 602 may be formed as a first protrusion located on a first portion (upper portion) of an inner surface of transformer box 208. Second guide 604 may be formed as a second protrusion located on a second portion (lower portion) of the inner surface of transformer box 208. In some embodiments, the first protrusion of first guide 602 may be angled towards the second direction such that as transformer box 208 moves in the first direction, the first force is continually applied to first arm 322 until it is fitted into cam 306. The width of first arm 322 may be designed such that first guide 602 no longer contacts first arm 322 once it is fitted into cam 306. Still further, the second protrusion of second guide 604 may be angled towards the first direction such that as transformer box 208 moves in the second direction, the second force is applied continually to second arm 324. The width of second arm 324 may be designed such that second guide 604 no longer contacts second arm 324 as it moves past pin 204.

Figure 7:
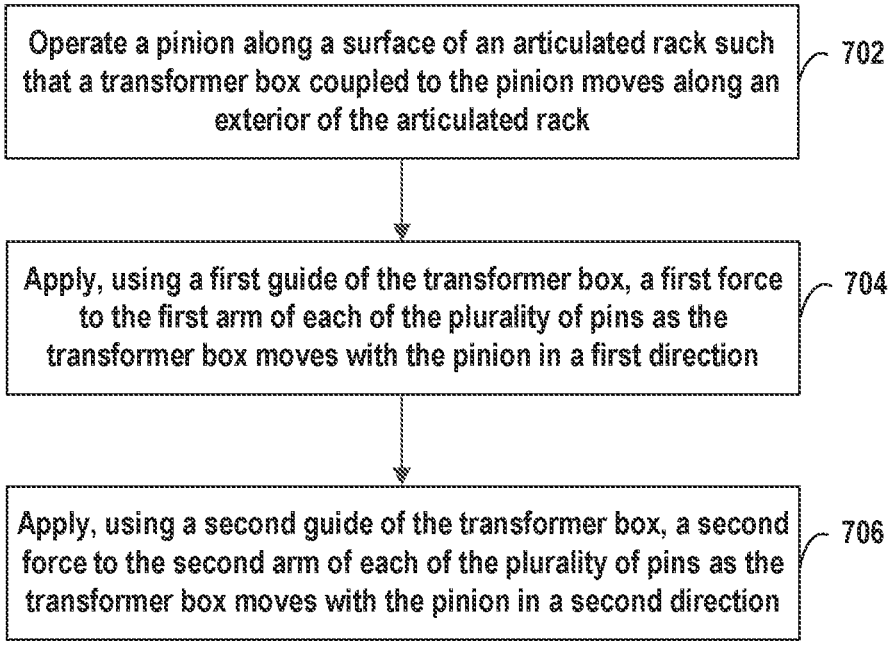
FIG. 7 illustrates a flowchart of an exemplary method of actuating a robotic drawer of the robotic drawer system of FIG. 1, according to certain embodiments of the present disclosure.

FIG. 7 illustrates a flowchart of an exemplary method 700 of actuating a robotic drawer of robotic drawer system 100 of FIG. 1, according to embodiments of the disclosure. Method 700 may be performed by an actuator, e.g., linear actuator 104, articulated components 202, pins 204, pinion 206, transformer box 208, or articulated rack. Method 700 may include steps 702-706 as described below. It is to be appreciated that some of the steps may be optional, and some of the steps may be performed simultaneously, or in a different order than those shown in FIG. 7.

At 702, the actuator may cause a pinion to be operated along a surface of an articulated rack such that a transformer box coupled to the pinion moves along an exterior of the articulated rack. For example, referring to FIGS. 2 and 3, articulation components 202 may include (along its top portion) one or more teeth 302, which may be configured to receive gear teeth of pinion 206. In some embodiments, a number of teeth associated with each articulation component 202 may increase the farther the articulation component 202 is from the proximal end of the articulated rack attached to the drawer, or vice versa. A motor coupled to pinion 206 may be configured to generate a force that rotates pinion 206 across the teeth 302 located along a top surface of the articulated rack. The motor may be battery operated, solar powered, or coupled to an external power source. Transformer box 208 may be coupled to pinion 206 such that it moves along the length of the articulated rack. Transformer box 208 may include two halves with a gap, which enables the articulated rack to move therebetween as the pinion 206 moves along its top.

At 704, the actuator may apply, using a first guide of the transformer box, a first force to the first arm of each of the plurality of pins as the transformer box moves with the pinion in a first direction. In some aspects, the first force may cause the pin to rotate in a first rotational direction until the first arm is fitted into a cam of the articulated rack and adjacent articulation components are held in a fixed position to open the robotic drawer. For example, referring to FIG. 6A, each half of transformer box 208 includes a first guide 602 configured to apply a first force to first arm 322 as transformer box 208 moves in a first direction along with pinion 206. The first force may cause pin 204 to rotate in a first rotational direction (which is counterclockwise in the present example) until first arm 322 is fitted into cam 306 of the articulated rack. Once fitted into cam 306, first arm 322 extends past interface 402 of adjacent articulation components 202 such they are held in a fixed position. As each articulation component 202 is held fixed against the next, linear actuator 104 is made to extend. As linear actuator 104 extends, an actuation force is generated to open drawer 102.

At 706, the actuator may apply, using a second guide of the transformer box, a second force to the second arm of each of the plurality of pins as the transformer box moves with the pinion in a second direction. In some aspects, the second force may cause the pin to rotate in a second rotational direction until the first arm is no longer fitted in the cam of the articulated rack such that adjacent articulation components are no longer held in the fixed position and the robotic drawer closes. For example, referring to FIG. 6B, each half of transformer box 208 also includes a second guide 604 configured to apply a second force to second arm 324 as transformer box 208 moves in a second direction along with pinion 206. The second force causes pin 204 to rotate in a second rotational direction (which is clockwise in the present example) until first arm 206 is no longer fitted in cam 306, which enables linear actuator 104 to bend. As the fixed position of each articulation component 202 is removed, the linear actuator 104 is made to bend. As the linear actuator 104 bends, an actuation force is generated to close drawer 102.

As compared with known approaches, linear actuator 104 described above in connection with FIGS. 1-7 provides a mechanism by which a flexible articulated rack can be made rigid to open drawer 102 rapidly with a high actuation force and with a high degree of precision, as compared to known actuators of similar size. Then, as the articulated rack is made flexible again and returns to its compact size, an opposing force is generated, which closes drawer 102 rapidly and with the same precision with which drawer 102 was opened.

According to one aspect of the disclosure, an actuator of a robotic drawer is disclosed. The actuator may include a plurality of articulation components coupled to form an articulated rack. The actuator may also include a plurality of pins each coupled to an exterior of one of the plurality of articulation components. Each pin may include a cylindrical body. Each pin may also include a first arm located at a first end of the cylindrical body. The actuator may further include a pinion configured to move along a surface of the articulated rack. The actuator may further include a transformer box coupled to the pinion and configured to move along an exterior of the articulated rack as the pinion moves along the surface. The transformer box may include a first guide configured to apply a first force to the first arm of each of the plurality of pins as the transformer box moves in a first direction. The first force may cause the pin to rotate in a first rotational direction until the first arm is fitted into a cam of the articulated rack such that adjacent articulation components are held in a fixed position, which may cause the articulated rack to extend.

In some embodiments, each pin may further comprise a second arm located at a second end of the cylindrical body.

In some embodiments, the transformer box may include a second guide configured to apply a second force to the second arm of each of the plurality of pins as the transformer box moves in a second direction. In some embodiments, the second force causing the pin to rotate in a second rotational direction until the first arm is no longer fitted in the cam of the articulated rack such that adjacent articulation components are no longer held in the fixed position, which may cause the articulated rack to bend.

In some embodiments, the first guide may be formed as a first protrusion located on a first portion of an inner surface of the transformer box. In some embodiments, the second guide may be formed as a second protrusion located on a second portion of the inner surface of the transformer box.

In some embodiments, the first protrusion may include a first angled surface configured to apply the first force to the first arm of each of the plurality of pins as the transformer box moves in the first direction.

In some embodiments, the second protrusion may have a second angled surface configured to apply the second force to the second arm of each of the plurality of pins as the transformer box moves in the second direction.

In some embodiments, the first angled surface may be angled towards the second direction and the second angled surface is angled towards the first direction.

In some embodiments, the first arm and the second arm may be both oriented perpendicular to a longitudinal axis of the cylindrical body. In some embodiments, the first arm and the second arm may be oriented perpendicular with respect to one another.

In some embodiments, each of the articulation components may comprise at least one groove configured to hold the cylindrical body of one of the plurality of pins.

In some embodiments, a plurality of pin covers may each be coupled to one of the plurality articulation components such that the cylindrical body is held within the at least one groove.

In some embodiments, when the first arm is fitted into the cam of the articulated rack, a longitudinal axis of the first arm may be oriented parallel to a length of the articulated rack and the first arm extends beyond an interface of the adjacent articulation components.

In some embodiments, each of the plurality of articulation components may include at least one tooth that fits into a gear of the pinion as the pinion moves.

In some embodiments, each of the plurality of articulation components may have a same number of teeth.

In some embodiments, a number of teeth associated with the plurality of articulation components may increase with distance from a first end of the articulated rack.

In some embodiments, the adjacent articulation components may be coupled by a coupling rod positioned through aligned apertures of interlocking base portions of each of the adjacent articulation components.

According to another aspect of the present disclosure, a robotic cabinet is disclosed. The robotic cabinet may include a frame. The robotic cabinet may further include at least one drawer positioned within the frame. The robotic cabinet may further include an actuator coupled to the at least one drawer.

The actuator may include a plurality of articulation components coupled to form an articulated rack. The actuator may also include a plurality of pins each coupled to an exterior of one of the plurality of articulation components. Each pin may include a cylindrical body. Each pin may also include a first arm located at a first end of the cylindrical body. The actuator may further include a pinion configured to move along a surface of the articulated rack. The actuator may further include a transformer box coupled to the pinion and configured to move along an exterior of the articulated rack as the pinion moves along the surface. The transformer box may include a first guide configured to apply a first force to the first arm of each of the plurality of pins as the transformer box moves in a first direction. The first force may cause the pin to rotate in a first rotational direction until the first arm is fitted into a cam of the articulated rack such that adjacent articulation components are held in a fixed position, which may cause the articulated rack to extend.

In some embodiments, each pin may further comprise a second arm located at a second end of the cylindrical body.

In some embodiments, the transformer box may include a second guide configured to apply a second force to the second arm of each of the plurality of pins as the transformer box moves in a second direction. In some embodiments, the second force causing the pin to rotate in a second rotational direction until the first arm is no longer fitted in the cam of the articulated rack such that adjacent articulation components are no longer held in the fixed position, which may cause the articulated rack to bend.

In some embodiments, the first guide may be formed as a first protrusion located on a first portion of an inner surface of the transformer box. In some embodiments, the second guide may be formed as a second protrusion located on a second portion of the inner surface of the transformer box.

In some embodiments, the first protrusion may include a first angled surface configured to apply the first force to the first arm of each of the plurality of pins as the transformer box moves in the first direction.

In some embodiments, the second protrusion may have a second angled surface configured to apply the second force to the second arm of each of the plurality of pins as the transformer box moves in the second direction.

In some embodiments, the first angled surface may be angled towards the second direction and the second angled surface is angled towards the first direction.

According to another aspect of the present disclosure, a method of actuating a robotic drawer is disclosed. The method may include operating a pinion along a surface of an articulated rack such that a transformer box coupled to the pinion moves along an exterior of the articulated rack. The articulated rack may include a plurality of articulation components. The articulated rack may also include a plurality of pins each coupled to an exterior of one of the plurality of articulation components. Each pin may include a cylindrical body. Each pin may also include a first arm located at a first end of the cylindrical body. Each pin may also include a second arm located at a second end of the cylindrical body. The method may also include applying, using a first guide of the transformer box, a first force to the first arm of each of the plurality of pins as the transformer box moves with the pinion in a first direction. The method may also include applying, using a second guide of the transformer box, a second force to the second arm of each of the plurality of pins as the transformer box moves with the pinion in a second direction. The first force may cause the pin to rotate in a first rotational direction until the first arm is fitted into a cam of the articulated rack and adjacent articulation components are held in a fixed position to open the robotic drawer. The second force cause the pin to rotate in a second rotational direction until the first arm is no longer fitted in the cam of the articulated rack such that adjacent articulation components are no longer held in the fixed position and the robotic drawer closes.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described embodiments, but should be defined only in accordance with the following claims and their equivalents.

What is claimed is:

1. An actuator of a robotic drawer, comprising:
   a plurality of articulation components coupled to form an articulated rack;
   a plurality of pins each coupled to an exterior of one of the plurality of articulation components, wherein each pin comprises:
      a cylindrical body, and
      a first arm located at a first end of the cylindrical body,
   a pinion configured to move along a surface of the articulated rack; and
   a transformer box coupled to the pinion and configured to move along an exterior of the articulated rack as the pinion moves along the surface,
      wherein the transformer box includes a first guide configured to apply a first force to the first arm of each of the plurality of pins as the transformer box moves in a first direction, the first force causing the pin to rotate in a first rotational direction until the first arm is fitted into a cam of the articulated rack such that adjacent articulation components are held in a fixed position, causing the articulated rack to extend.

2. The actuator of claim 1, wherein each pin further comprises:
   a second arm located at a second end of the cylindrical body.

3. The actuator of claim 2, wherein the transformer box includes a second guide configured to apply a second force to the second arm of each of the plurality of pins as the transformer box moves in a second direction, the second force causing the pin to rotate in a second rotational direction until the first arm is no longer fitted in the cam of the articulated rack such that adjacent articulation components are no longer held in the fixed position, causing the articulated rack to bend.

4. The actuator of claim 3, wherein:
   the first guide is formed as a first protrusion located on a first portion of an inner surface of the transformer box, and
   the second guide is formed as a second protrusion located on a second portion of the inner surface of the transformer box.

5. The actuator of claim 4, wherein the first protrusion includes a first angled surface configured to apply the first force to the first arm of each of the plurality of pins as the transformer box moves in the first direction.

6. The actuator of claim 5, wherein the second protrusion has a second angled surface configured to apply the second force to the second arm of each of the plurality of pins as the transformer box moves in the second direction.

7. The actuator of claim 6, wherein the first angled surface is angled towards the second direction and the second angled surface is angled towards the first direction.

8. The actuator of claim 2, wherein:
   the first arm and the second arm are both oriented perpendicular to a longitudinal axis of the cylindrical body, and
   the first arm and the second arm are oriented perpendicular with respect to one another.

9. The actuator of claim 1, wherein each of the articulation components comprises:
   at least one groove configured to hold the cylindrical body of one of the plurality of pins.

10. The actuator of claim 9, further comprising:
    a plurality of pin covers each coupled to one of the plurality articulation components such that the cylindrical body is held within the at least one groove.

11. The actuator of claim 1, wherein when the first arm is fitted into the cam of the articulated rack, a longitudinal axis of the first arm is oriented parallel to a length of the articulated rack and the first arm extends beyond an interface of the adjacent articulation components.

12. The actuator of claim 1, wherein each of the plurality of articulation components includes at least one tooth that fits into a gear of the pinion as the pinion moves.

13. The actuator of claim 12, wherein each of the plurality of articulation components has a same number of teeth.

14. The actuator of claim 12, wherein a number of teeth associated with the plurality of articulation components increases with distance from a first end of the articulated rack.

15. The actuator of claim 1, wherein the adjacent articulation components are coupled by a coupling rod positioned through aligned apertures of interlocking base portions of each of the adjacent articulation components.

16. A robotic cabinet, comprising:
   a frame;
   at least one drawer positioned within the frame; and
   an actuator coupled to the at least one drawer, the actuator comprising:
      a plurality of articulation components coupled to form an articulated rack;
      a plurality of pins each coupled to an exterior of one of the plurality of articulation components, wherein each pin comprises:
         a cylindrical body, and
         a first arm located at a first end of the cylindrical body,
      a pinion configured to move along a surface of the articulated rack; and a transformer box coupled to the pinion and configured to move along an exterior of the articulated rack as the pinion moves along the surface, wherein the transformer box includes a first guide configured to apply a first force to the first arm of each of the plurality of pins as the transformer box moves in a first direction, the first force causing the pin to rotate in a first rotational direction until the first arm is fitted into a cam of the articulated rack such that adjacent articulation components are held in a fixed position, causing the articulated rack to extend.

17. The robotic cabinet of claim 16, wherein each pin further comprises:

a second arm located at a second end of the cylindrical body.

18. The robotic cabinet of claim 17, wherein the transformer box includes a second guide configured to apply a second force to the second arm of each of the plurality of pins as the transformer box moves in a second direction, the second force causing the pin to rotate in a second rotational direction until the first arm is no longer fitted in the cam of the articulated rack such that adjacent articulation components are no longer held in the fixed position causing the articulated rack to bend.

19. The robotic cabinet of claim 18, wherein:

the first guide is formed as a first protrusion located on a first portion of an inner surface of the transformer box, the second guide is formed as a second protrusion located on a second portion of the inner surface of the transformer box, the first protrusion includes a first angled surface configured to apply the first force to the first arm of each of the plurality of pins as the transformer box moves in the first direction, the second protrusion has a second angled surface configured to apply the second force to the second arm of each of the plurality of pins as the transformer box moves in the second direction, and the first angled surface is angled towards the second direction and the second angled surface is angled towards the first direction.

20. A method of actuating a robotic drawer, comprising:

operating a pinion along a surface of an articulated rack such that a transformer box coupled to the pinion moves along an exterior of the articulated rack, the articulated rack comprising:

a plurality of articulation components;

a plurality of pins each coupled to an exterior of one of the plurality of articulation components, wherein each pin comprises:

a cylindrical body, a first arm located at a first end of the cylindrical body, and a second arm located at a second end of the cylindrical body;

applying, using a first guide of the transformer box, a first force to the first arm of each of the plurality of pins as the transformer box moves with the pinion in a first direction; and applying, using a second guide of the transformer box, a second force to the second arm of each of the plurality of pins as the transformer box moves with the pinion in a second direction, wherein the first force causes the pin to rotate in a first rotational direction until the first arm is fitted into a cam of the articulated rack and adjacent articulation components are held in a fixed position to open the robotic drawer, and wherein the second force causes the pin to rotate in a second rotational direction until the first arm is no longer fitted in the cam of the articulated rack such that adjacent articulation components are no longer held in the fixed position and the robotic drawer closes.

* * * * *